Nov. 22, 1927.                                                         1,650,114
W. D. CLARK
FLYING MACHINE
Filed Feb. 13, 1925                      2 Sheets-Sheet 1
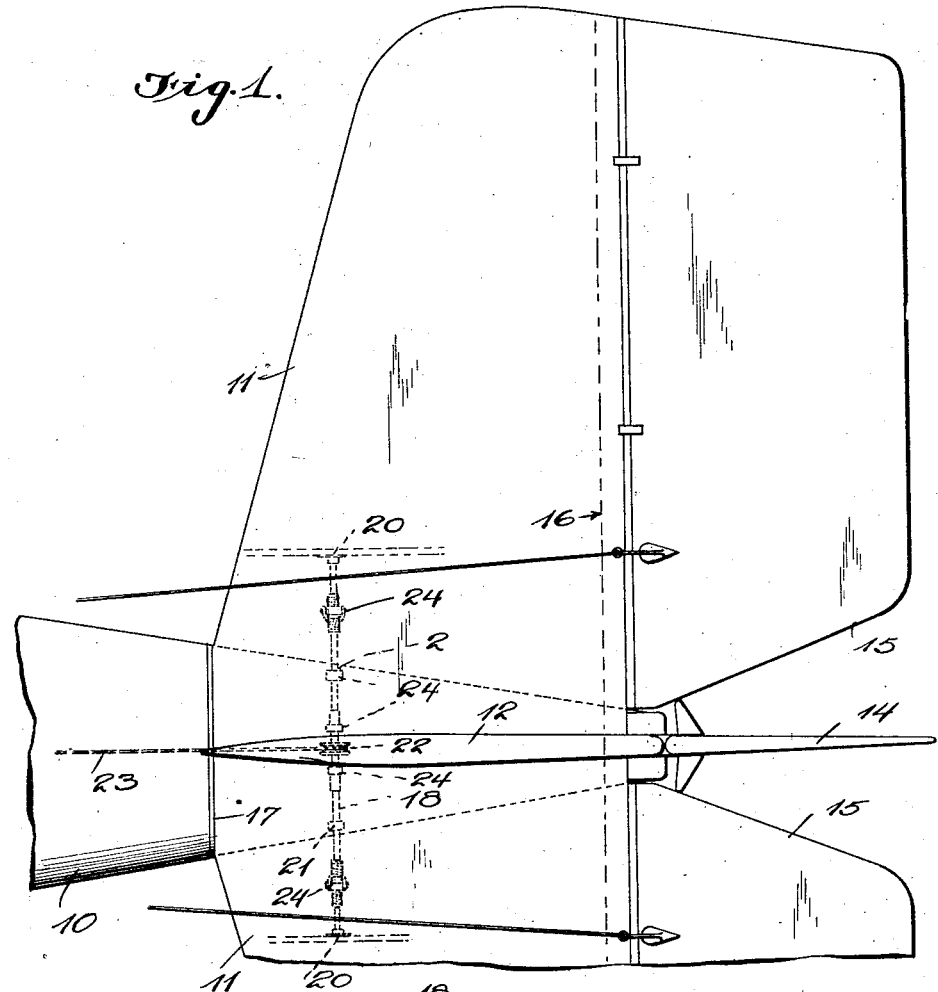
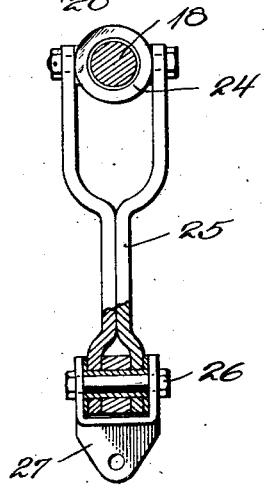
Inventor
William Douglas Clark
By
Attorney Nov. 22, 1927.
W. D. CLARK
FLYING MACHINE
Filed Feb. 13, 1925
1,650,114
2 Sheets-Sheet 2
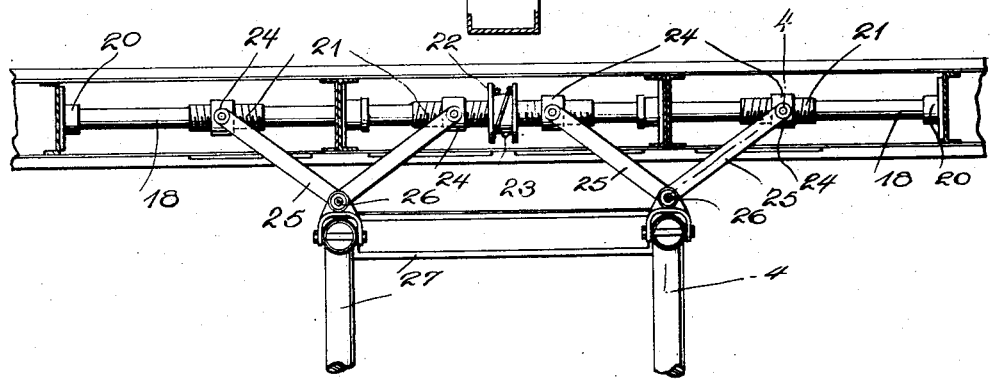
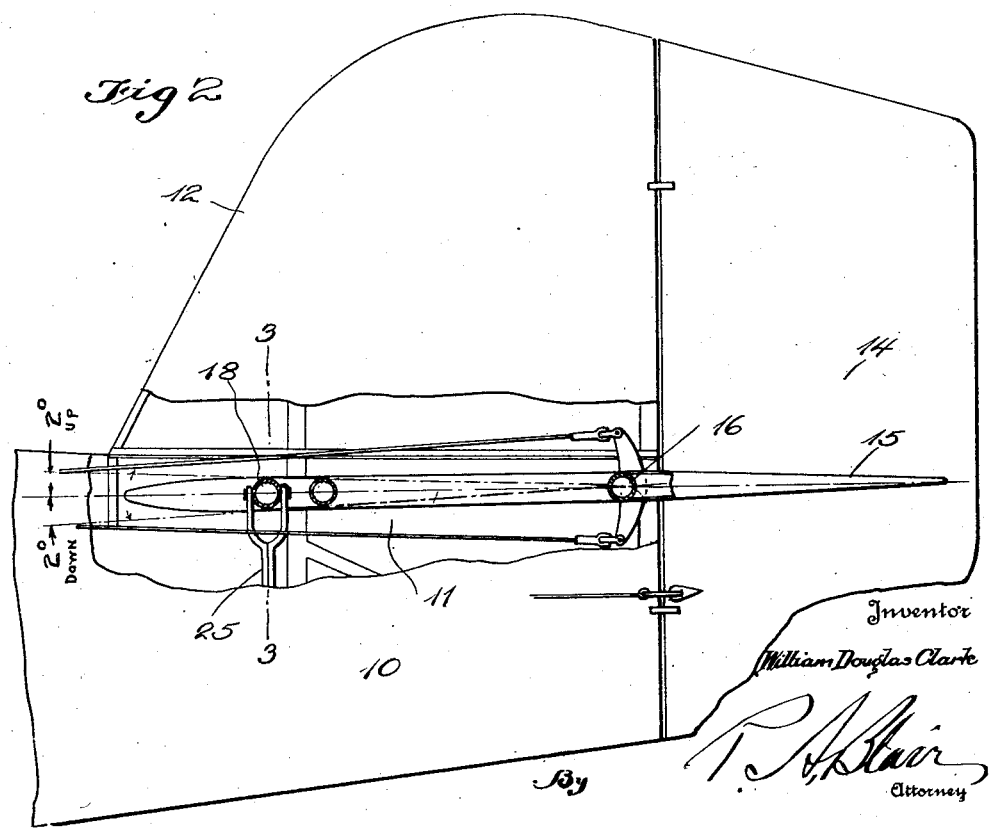

Patented Nov. 22, 1927.

1,650,114

UNITED STATES PATENT OFFICE.

WILLIAM DOUGLAS CLARK, OF WASHINGTON, DISTRICT OF COLUMBIA.

FLYING MACHINE.

Application filed February 13, 1925. Serial No. 9,060.

This invention relates to improvements in flying machines and more particularly to the tail construction of airplanes. As is well known to those familiar with the subject, it is necessary to compensate for change in the center of gravity of the airplane, as this center of gravity moves due to the consumption of fuel or movement of the passengers and stabilizing means have been provided for this purpose.

It has been the usual practice to locate the adjusting screw in a vertical position in the fuselage and apply the force for moving the stabilizer at the rear spar. As the latter is usually more heavily loaded than the front spar it is usually required to be externally braced. This bracing has to be carried on a king post which must be moved with the stabilizer. This adds to complication and weight.

The present device is housed in the stabilizer and not in the fuselage in such a manner that it is self contained and may be removed with the stabilizer. The purpose is to provide a means of changing in flight the angle which the stabilizer presents to the direction of air flow so that it may take a variable load to compensate for the shift of the center of gravity of the airplane due to the consumption of fuel, movement of passengers or any other condition that may change the trim of the airplane in flight.

Other objects will be in part obvious and in part hereinafter pointed out in the accompanying drawings wherein is shown one of various possible embodiments of the invention and wherein corresponding parts are denoted by similar reference characters.

Figure 1 is a fragmentary plan of the tail of an airplane.

Figure 2 is a side elevation of the same with parts of the outer surface broken away.

Figure 3 is a vertical transverse section on the line 3—3 of Figure 2, showing the adjusting mechanism.

Figure 4 is a section on the line 4—4 of Figure 3 showing one of the operating links.

Referring now to the drawings in detail, 10 indicates the fuselage or tail portion of a flying machine or airplane provided with horizontal stabilizing surface 11 and vertical planes 12. A rudder 14 and pivoted horizontal planes 15 are provided and operated in the usual well-known manner. The stabilizer or horizontal plane 11 is provided with a rear spar 16 parallel to the line of engagement with the horizontally pivoted planes or elevators 15. This spar, which is mounted in the rear of the fuselage 10 provides a bearing to permit of rotary movement to serve as a center of rotation for the stabilizer. This construction also permits this rear spar to be externally braced in the simplest manner and yet permit the forward end or edge 17 thereof to move up and down as and when desired according to the shift of the center of gravity. Near this forward edge there is positioned a shaft 18 which is built into the stabilizer so that it is free to rotate in bearings 20 at its ends as shown clearly in Figure 1. This shaft is provided with right and left threads 21 as shown in Figure 3 and is fitted at its center with a drum 22 so that the shaft may be rotated by wires 23 leading to the pilot's position. Four threaded and trunnioned sleeves 24 coact with these right and left-hand threaded portions and to the trunnions of these sleeves are forked levers 25 pivoted at 26 to the frame construction 27. This construction permits the links 25 to move about their fixed pivot points 26 as the shaft 18 is turned to cause the shaft and its associated construction to move either upwardly or downwardly two degrees as shown more clearly in Figure 2, for it will be clear that as the shaft 18 is rotated by means of the drum 22 the trunnion sleeves 24 will be moved towards or from each other according to the direction of rotation.

From the above it will be seen that if, for example, the center of gravity of the machine should be moved aft due to consumption of fuel in the gas tank, it would be necessary to operate the compensating means to cause a relative upward movement of the leading edge of the stabilizer whereby the craft will travel on a more even keel.

The mechanism is compact, self-contained and of the simplest construction and is believed to accomplish among others all of the objects and advantages herein set forth.

What I claim is:—

1. In an airplane, in combination, a horizontal stabilizer hinged at its rear end and having its forward or leading edge free to be raised and lowered as desired and means for accomplishing such adjustment during flight, said means including right and left-hand screw mechanism housed within the stabilizer surface.

2. In an airplane, in combination, an adjustable stabilizer having a forward end free to move upwardly or downwardly and a hinged construction at its rear edge, means for causing such adjustment comprising a rotatable shaft mounted in said stabilizer and means operated from a distance for rotating said shaft in either direction.

3. In an airplane, in combination, an adjustable stabilizer having a forward end free to move upwardly or downwardly and a hinged construction at its rear edge, means for causing such adjustment comprising a rotatable shaft mounted in said stabilizer, means operated from a distance for rotating such shaft in either direction, said shaft having right and left-hand threaded portions and linkage between said threaded portions and a fixed part of the plane for holding said stabilizer in adjusted position.

Signed at Washington, District of Columbia, this 24th day of December, 1924.

WILLIAM DOUGLAS CLARK.